US010066750B2

(12) United States Patent
Nakaniwa et al.

(10) Patent No.: US 10,066,750 B2
(45) Date of Patent: Sep. 4, 2018

(54) ROTARY MACHINE

(71) Applicant: MITSUBISHI HEAVY INDUSTRIES COMPRESSOR CORPORATION, Tokyo (JP)

(72) Inventors: Akihiro Nakaniwa, Tokyo (JP); Shinichiro Tokuyama, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 574 days.

(21) Appl. No.: 14/433,240

(22) PCT Filed: Oct. 9, 2013

(86) PCT No.: PCT/JP2013/077500
§ 371 (c)(1),
(2) Date: Apr. 2, 2015

(87) PCT Pub. No.: WO2014/077058
PCT Pub. Date: May 22, 2014

(65) Prior Publication Data
US 2015/0260294 A1 Sep. 17, 2015

(30) Foreign Application Priority Data

Nov. 13, 2012 (JP) ................................. 2012-249142

(51) Int. Cl.
*F16J 15/44* (2006.01)
*F01D 11/02* (2006.01)
(Continued)

(52) U.S. Cl.
CPC ............. *F16J 15/447* (2013.01); *F01D 11/02* (2013.01); *F04D 29/102* (2013.01);
(Continued)

(58) Field of Classification Search
CPC ........ F16J 15/44; F16J 15/444; F16J 15/4472; F01D 11/001; F01D 11/02; F01D 11/127; F05D 2250/283
See application file for complete search history.

(56) References Cited

U.S. PATENT DOCUMENTS 4,046,388 A * 9/1977 Meyer ..................... F01D 11/02
 277/418
4,416,457 A 11/1983 McGinnis et al.
(Continued)

FOREIGN PATENT DOCUMENTS

EP 2749797 A1 7/2014
JP 2012-13083 A 1/1919
(Continued)

OTHER PUBLICATIONS

Japanese Office Action dated Dec. 15, 2015 in Counterpart Application No. JP 2014-546906 with an English Translation.
(Continued)

*Primary Examiner* — Nicholas L Foster
(74) *Attorney, Agent, or Firm* — Birch, Stewart, Kolasch & Birch, LLP

(57) ABSTRACT

A rotary machine includes a casing that is disposed on the outer circumference side of a rotating shaft and rotates about the axis relative to the rotating shaft, and a hole pattern seal that is fixed to the casing, divides a space between the rotating shaft and the casing into a high pressure side and a low pressure side, and has a first hole line on which a plurality of first hole portions are formed at intervals in a circumferential direction so as to face an outer circumferential surface of the rotating shaft. The hole pattern seal has fin portions that extend toward the rotating shaft at the high-pressure side of the first hole line and in the circumferential direction. The rotating shaft includes a convex portion that protrude from the outer circumferential surface (Continued)

of the rotating shaft toward the first hole portions to extend in the circumferential direction, and face the first hole portions at the low pressure side of the fin portion. The convex portion has a wall surface facing the fin portions.

10 Claims, 14 Drawing Sheets

(51) Int. Cl.
  *F04D 29/10* (2006.01)
  *F16J 15/447* (2006.01)
(52) U.S. Cl.
  CPC ......... *F16J 15/444* (2013.01); *F16J 15/4472* (2013.01); *F05D 2250/191* (2013.01); *F05D 2250/283* (2013.01)

(56) References Cited

U.S. PATENT DOCUMENTS

| | | | | |
|---|---|---|---|---|
| 4,477,089 | A * | 10/1984 | Hoffman | F01D 11/02 228/181 |
| 5,037,114 | A * | 8/1991 | Gray | F01D 11/12 277/414 |
| 5,161,942 | A * | 11/1992 | Chen | F01D 11/127 277/414 |
| 5,540,447 | A * | 7/1996 | Shultz | F01D 25/04 277/303 |
| 5,707,064 | A * | 1/1998 | Vance | F01D 25/04 277/414 |
| 5,707,207 | A * | 1/1998 | Benoist | F01D 11/005 277/415 |
| 5,794,942 | A * | 8/1998 | Vance | F01D 25/04 277/303 |
| 6,644,914 | B2 * | 11/2003 | Lawer | B23H 9/10 29/888.3 |
| 6,692,227 | B2 * | 2/2004 | Tomita | F01D 5/225 415/173.7 |
| 8,434,766 | B2 * | 5/2013 | Zeng | F01D 11/001 277/412 |
| 8,915,705 | B2 * | 12/2014 | Eelman | F01D 11/025 415/171.1 |
| 9,011,083 | B2 * | 4/2015 | De Martino | F01D 11/001 415/170.1 |
| 9,752,780 | B2 * | 9/2017 | Jones | F23R 3/002 |
| 2002/0106276 | A1 * | 8/2002 | Tomita | F01D 5/225 415/173.3 |
| 2004/0239040 | A1 * | 12/2004 | Burdgick | F01D 11/001 277/414 |
| 2007/0069477 | A1 | 3/2007 | Li et al. | |
| 2007/0274825 | A1 * | 11/2007 | De Martino | F01D 11/001 415/173.1 |
| 2010/0034646 | A1 | 2/2010 | Magara et al. | |
| 2010/0127944 | A1 | 5/2010 | Breiter | |
| 2011/0020114 | A1 | 1/2011 | Eelman | |
| 2012/0027573 | A1 * | 2/2012 | Ali | F01D 5/225 415/173.1 |
| 2012/0043728 | A1 | 2/2012 | Zeng et al. | |
| 2014/0020403 | A1 * | 1/2014 | Tsukuda | F01D 11/001 60/805 |
| 2015/0000288 | A1 * | 1/2015 | Jones | F23R 3/002 60/754 |
| 2015/0337851 | A1 * | 11/2015 | Hashizume | F16J 15/444 415/170.1 |
| 2016/0230582 | A1 * | 8/2016 | Schlothauer | F01D 11/08 |
| 2017/0284212 | A1 * | 10/2017 | Kloetzer | F01D 11/125 |

FOREIGN PATENT DOCUMENTS

| | | |
|---|---|---|
| JP | 61-142397 A | 6/1986 |
| JP | 63-50607 A | 3/1988 |
| JP | 2-2441 B2 | 1/1990 |
| JP | 3-17477 U | 2/1991 |
| JP | 5-222954 A | 8/1993 |
| JP | 8-338537 A | 12/1996 |
| JP | 2001-90555 A | 4/2001 |
| JP | 2003-148397 A | 5/2003 |
| JP | 3999492 B2 | 10/2007 |
| JP | 4220631 B2 | 2/2009 |
| JP | 2009-85256 A | 4/2009 |
| JP | 2010-106778 A | 5/2010 |
| JP | 4655123 B2 | 3/2011 |
| JP | 2014-20509 A | 2/2014 |
| KR | 10-1007119 B1 | 1/2011 |
| WO | WO 2012/129475 A | 9/1927 |

OTHER PUBLICATIONS

Office Action dated Feb. 14, 2017 in Counterpart JP Application No. 2016-098309 with an English Translation.
English translation of the Written Opinion of the International Searching Authority (Form PCT/ISA/237) for International Application No. PCT/JP2013/077500, dated Jan. 14, 2014.
Extended European Search Report for European Application No. 13655439.9, dated Sep. 21, 2015.
International Search Report (Form PCT/ISA/210) for International Application No. PCT/JP2013/077500, dated Jan. 14, 2014.
International Search Report, issued in PCT/JP2013/077500, dated Jan. 14, 2014.
Written Opinion of the International Searching Authority, issued in PCT/JP2013/077500, dated Jan. 14, 2014.

* cited by examiner

ROTARY MACHINE

TECHNICAL FIELD

The present invention relates to a rotary machine such as a turbine.

Priority is claimed on Japanese Patent Application No. 2012-249142, filed on Nov. 13, 2012, the content of which is incorporated herein by reference.

BACKGROUND ART

In general, in rotary machines such as turbines and centrifugal compressors, a sealing mechanism is provided to prevent a fluid from leaking from a gap between a stationary side and a rotating side.

Such a sealing mechanism is generally a non-contact sealing mechanism from the viewpoint of, for instance, a maintenance characteristic. However, the non-contact sealing mechanism needs to set as small a clearance as possible in order to reduce the leakage of a fluid.

The sealing mechanism may give rise to self-excited vibration due to a swirl flow (hereinafter referred to simply as "swirl") of an entering fluid. In the sealing mechanism, the clearance should be set to prevent the stationary side and the rotating side from being brought into contact by such self-excited vibration. For this reason, in the non-contact sealing mechanism, it is impossible to reduce the clearance, and it is difficult to further reduce the leakage of the fluid.

There is a proposal for a technique that counteracts the swirl responsible for the self-excited vibration by ejecting a high-pressure fluid with respect to the fluid flowing into a gap between the stationary side and the rotating side (for example, see Patent Literatures 1 and 2).

On the other hand, as the non-contact sealing mechanism capable of reducing the swirl, a so-called hole seal having innumerable holes formed in an inner circumferential surface of the stationary side is known. When such a hole seal is used, a vortex is generated in the holes. The vortex in the holes interferes with the swirl, and the swirl is suppressed.

CITATION LIST

Patent Literature

[Patent Literature 1]
Japanese Unexamined Patent Application, First Publication No. 2003-148397
[Patent Literature 2]
Japanese Unexamined Patent Application, First Publication No. H08-338537

SUMMARY OF INVENTION

Technical Problem

Incidentally, the techniques described in Patent Literatures 1 and 2 can reduce the swirl to suppress the self-excited vibration. However, the techniques described in Patent Literatures 1 and 2 cannot substantially reduce the leakage of the high-pressure fluid because the high-pressure fluid is ejected to the low pressure side.

Further, in the case of the hole seal, the swirl can be reduced by the vortexes. However, in the case of the hole seal, since a fluid flowing in an axial direction is merely constricted by the gap, it has been difficult to reduce the aforementioned leakage until now.

The present invention provides a rotary machine capable of reducing the leakage of a fluid from a high pressure side to a low pressure side while reducing a swirl occurring between a rotating side and a stationary side.

Solution to Problem

According to a first aspect of the present invention, there is provided a rotary machine, which includes a rotor that extends along an axis; a stator that is disposed at an outer circumference side of the rotor and rotates about the axis relative to the rotor; and a hole pattern seal that is fixed to the stator, divides a space between the rotor and the stator into a high pressure side and a low pressure side, and has a first hole line on which a plurality of first hole portions facing an outer circumferential surface of the rotor are formed at intervals in a circumferential direction. The hole pattern seal has fin portions that extend toward the rotor at the high pressure side of the first hole line and in the circumferential direction. The rotor includes a convex portion that protrude from the outer circumferential surface thereof toward the first hole portions to extend in the circumferential direction, and face the first hole portions at the low pressure sides of the fin portions, and the convex portion have wall surfaces facing the fin portions.

According to a second aspect of the present invention, in the rotary machine of the first aspect, a plurality of the first hole lines may be provided at intervals in an axis direction, and the fin portions may each be provided at the high pressure side of each first hole line. The convex portion may each be provided at the low pressure side of each fin portion so as to face the first hole portions of each first hole line. The hole pattern seal may include at least one second hole line, which has a plurality of second hole portions formed at intervals in the circumferential direction, at the low pressure side of each first hole line.

According to a third aspect of the present invention, in the rotary machine of the second aspect, the first hole portions and the second hole portions may be squarely-arranged.

According to a fourth aspect of the present invention, in the rotary machine of any one of the first to third aspects, the fin portions may be inclined such that distal sides thereof directed the high pressure side.

According to a fifth aspect of the present invention, in the rotary machine of any one of the first to fourth aspects, the fin portions may have distal sides formed in a tapered shape.

According to a sixth aspect of the present invention, in the rotary machine of any one of the first to fourth aspects, the second hole portions may be formed to have shallower depths than depths of the first hole portions.

According to a seventh aspect of the present invention, in the rotary machine of any one of the first to fourth aspects, the first hole portions may be formed to have a greater diameter than the second hole portions.

According to an eighth aspect of the present invention, in the rotary machine of any one of the second to seventh aspects, the plurality of the second hole portions may be provided in the axis direction between the first hole lines adjacent to each other in the axis direction.

Advantageous Effects of Invention

According to the aforementioned rotary machine, it is possible to reduce the leakage of the fluid from the high pressure side to the low pressure side while reducing the swirl occurring between the rotating side and the stationary side.

DESCRIPTION OF EMBODIMENTS

Hereinafter, a centrifugal compressor that is a rotary machine in a first embodiment of the present invention will be described based on the drawings.

Figure 1:
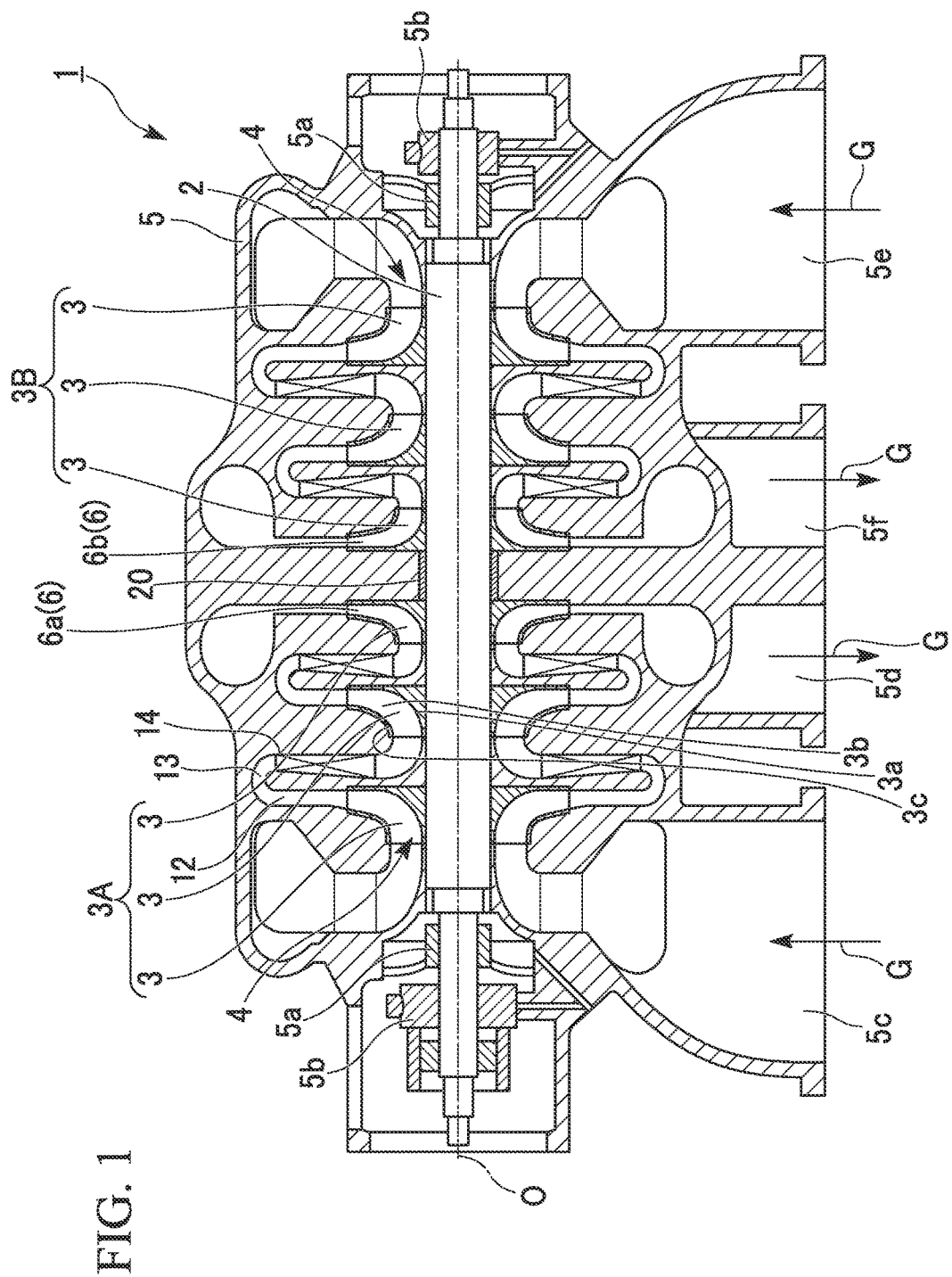
FIG. 1 is a cross-sectional view showing a schematic configuration of a centrifugal compressor according to a first embodiment of the present invention.

FIG. 1 is a cross-sectional view showing a schematic constitution of a centrifugal compressor 1 according to a first embodiment of the present invention.

As shown in FIG. 1, the centrifugal compressor 1 in the present embodiment is a multistage centrifugal compressor. The centrifugal compressor 1 is equipped with, for instance, two sets of three-stage impeller groups.

The centrifugal compressor 1 includes a rotating shaft (rotor) 2, impellers 3, a casing 5, and a sealing mechanism 20.

The rotating shaft (rotor) 2 rotates about an axis O.

The impellers 3 are mounted on the rotating shaft 2, and compress a process gas (fluid) G using a centrifugal force.

The casing 5 rotatably supports the rotating shaft 2. The casing 5 is formed with return channels 4 that cause the process gas G to flow from a high pressure side to a low pressure side.

The sealing mechanism 20 is provided along an outer circumferential surface of the rotating shaft 2.

The casing 5 is formed to have an approximately columnar outline. The rotating shaft 2 is disposed to pass through the center of the casing 5. Opposite ends of the casing 5 are each provided with a journal bearing 5a and a thrust bearing 5b. Opposite ends of the rotating shaft 2 are rotatably supported by the journal bearings 5a and the thrust bearings 5b. That is, the rotating shaft 2 is supported on the casing 5 via the journal bearings 5a and the thrust bearings 5b.

Suction ports 5c and 5e for suctioning the process gas G from a radial outer side of the casing 5 are provided in lateral faces of the casing 5 which are near the opposite ends of the casing 5. Discharge ports 5d and 5f are provided in the middle of the casing 5 in an axis O direction in order to discharge the process gas G to the radial outer side of the casing 5. The casing 5 is formed with an internal space 6a (6) that causes the suction port 5c and the discharge port 5d to communicate with each other, and an internal space 6b (6) that causes the suction port 5e and the discharge port 5f to communicate with each other.

The multiple impellers 3 housed inside the casing 5 constitute two sets of three-stage impeller groups 3A and 3B in which directions of blades 3b are directed away from each other in the axis O direction of the rotating shaft 2. The three-stage impeller group 3A and the three-stage impeller group 3B are mounted on the rotating shaft 2 in a state in which the backs thereof face the middle in the axis O direction.

The impellers 3 are each equipped with a disc 3a, blades 3b, and a cover part 3c.

The disc 3a is formed in the shape of an approximate disc whose diameter is gradually increased toward the discharge ports 5d and 5f in the axis O direction.

The blades 3b are radially mounted on the disc 3a. The multiple blades 3b are arranged in a circumferential direction.

The cover part 3c is mounted to cover distal sides of the multiple blades 3b in a circumferential direction.

The blades 3b of the impellers 3 constituting the three-stage impeller group 3A and the blades 3b of the impellers 3 constituting the three-stage impeller group 3B are symmetrically formed around the axis O of the rotating shaft 2. When the rotating shaft 2 is rotated, the three-stage impeller groups 3A and 3B are configured to circulate and compress the process gas G from the suction ports 5c and 5e toward the discharge ports 5d and 5f, respectively.

The internal space 6 includes the return channels 4. Each return channel 4 causes the process gas G to flow from channel outlets of the impellers 3 toward respective channel inlets. Each return channel 4 has a diffuser portion 12, a bend portion 13, and a return portion 14. The diffuser portion 12 guides the process gas G, which is compressed by the impeller 3 and is discharged from the channel outlet of the impeller 3 toward a radial outer side of the impeller 3, to the radial outer side thereof.

A radial outer side portion of the diffuser portion 12 communicates with the return portion 14 via the bend portion 13. However, in place of the return portions 14, the discharge ports 5d and 5f are formed in the radial outer side portions of the diffuser portions 12 connected to the third stage impellers 3 of the three-stage impeller groups 3A and 3B.

The bend portion 13 is a curved channel A first end side of the bend portion 13 is connected to the diffuser portion 12. The second end of the bend portion 13 is connected to the return portion 14. The bend portion 13 redirects the process gas G, which flows through the diffuser portion 12 in a radially outward direction, so as to be directed to the radial inner side, and sends the process gas G to the return portion 14. The return portion 14 is connected to the second end of the bend portion 13 on the radial outer side. The return portion 14 is connected to the channel inlet of the impeller 3 on the radial inner side.

The centrifugal compressor 1 of the present embodiment has the aforementioned constitution. Subsequently, an operation of the centrifugal compressor 1 will be described.

First, in the three-stage impeller group 3A, the process gas G suctioned from the suction port 5c is introduced into the return channel 4 and is compressed while flowing sequentially to the impeller 3, the diffuser portion 12, the bend portion 13, and the return portion 14 from the first stage to the third stage. Afterwards, the compressed process gas G flowing through to the third stage diffuser portion 12 is discharged from the discharge port 5d. The process gas G discharged from the discharge port 5d is sent to the suction port 5e through a pipeline (not shown) connected from the discharge port 5d to the suction port 5e.

Subsequently, in the three-stage impeller group 3B, the process gas G suctioned from the suction port 5e is introduced into the return channel 4, and is compressed again while flowing sequentially to the impeller 3, the diffuser portion 12, the bend portion 13, and the return portion 14 from the first stage to the third stage. Afterwards, the compressed process gas G flowing through to the third stage diffuser portion 12 is discharged from the discharge port 5f.

In comparison with the process gas G adjacent to the discharge port 5d of the three-stage impeller group 3A, the process gas G adjacent to the discharge port 5f of the aforementioned three-stage impeller group 3B has a high pressure in proportion as it is compressed by the three-stage impeller group 3B. That is, a pressure difference occurs between the process gas G around the rotating shaft 2 in the vicinity of the discharge port 5d in the axis O direction and the process gas G around the rotating shaft 2 in the vicinity of the discharge port 5f in the axis O direction. For this reason, the sealing mechanism 20, by which the high pressure side and the low pressure side are sectioned off in the axis O direction of the rotating shaft 2 and which prevents the process gas G from leaking while allowing rotation of the rotating shaft 2, is provided between the third stage impellers 3. The sealing mechanism 20 is disposed on an outer circumference side of the rotating shaft 2, and is configured to be rotatable about the axis O relative to the rotating shaft 2.

Figure 2:
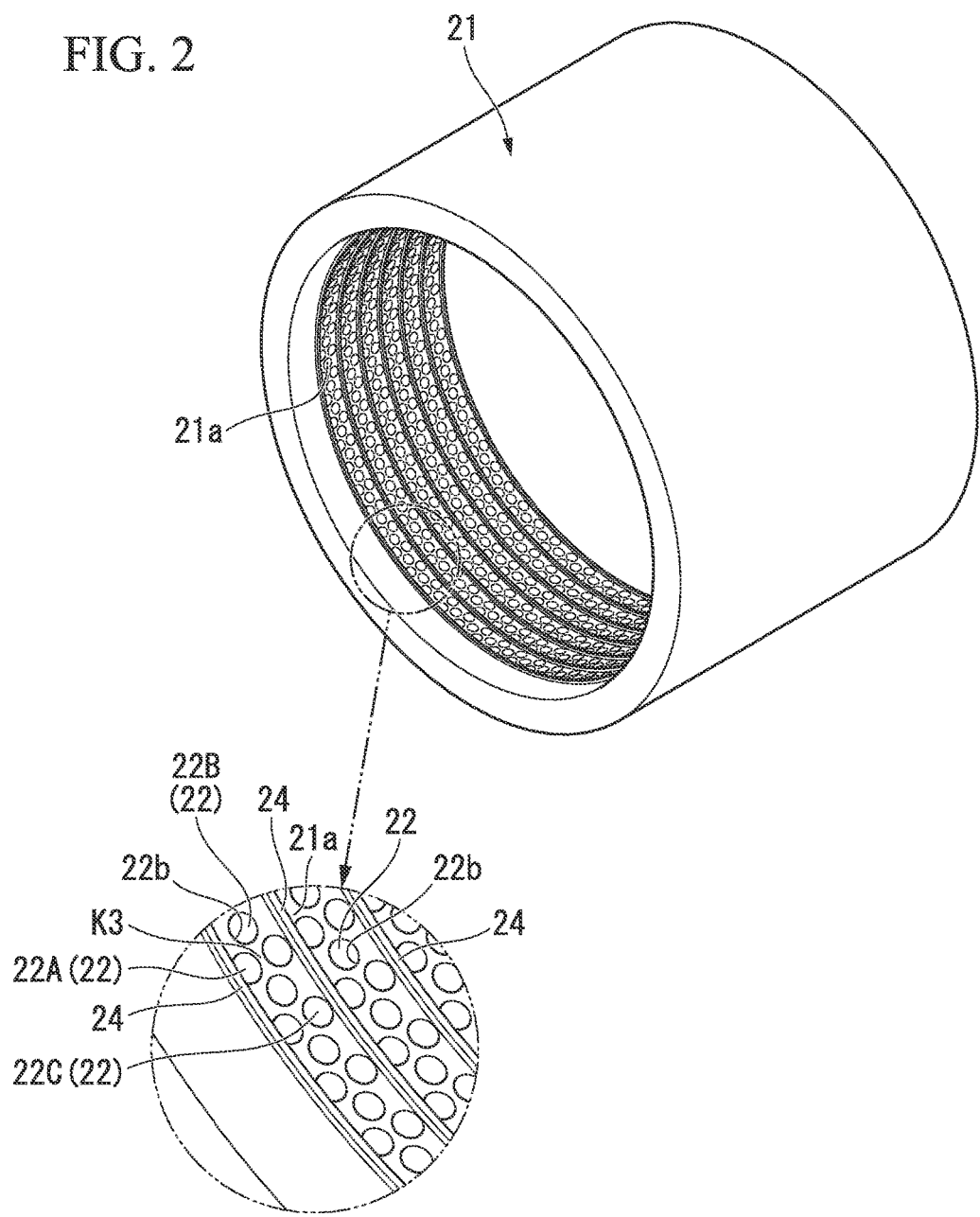
FIG. 2 is a perspective view showing a hole pattern seal in a sealing mechanism of the centrifugal compressor.
Figure 3:
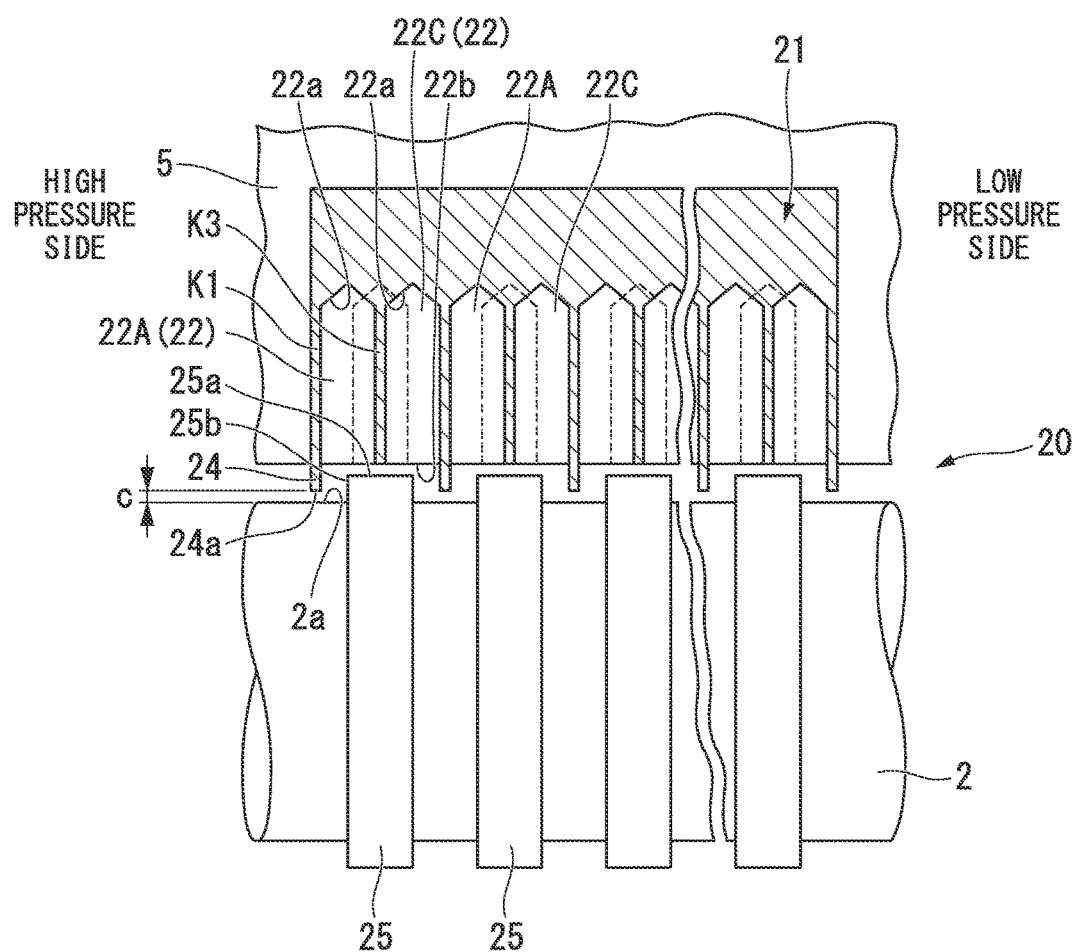
FIG. 3 is a partial cross-sectional view of the sealing mechanism in the centrifugal compressor.

As shown in FIGS. 2 and 3, a hole pattern seal 21 of which the sealing mechanism 20 is formed is disposed on an inner circumference of the annular casing 5 disposed with a gap from the rotating shaft 2. Multiple hole portions 22 that are open to an inner circumference side of the hole pattern seal 21 are formed in an inner circumferential surface 21a of the hole pattern seal 21. These hole portions 22 are formed in a circular cross section having approximately the same hole diameter. All axes of the hole portions 22 are disposed to extend in a radial direction of the rotating shaft 2. A bottom face 22a of each hole portion 22 has a conical shape (see FIG. 3). In other words, the bottom face 22a is formed such that a diameter thereof is reduced outward in a radial direction. Openings 22b of the hole portions 22 of the hole pattern seal 21 are disposed on the inner circumferential surface 21a of the hole pattern seal 21 in an approximate zigzag shape. Here, in FIG. 3, a leftward/rightward direction of the sheet is defined as the axis O direction, and an upward/downward direction of the sheet is defined as a circumferential direction.

Figure 4:
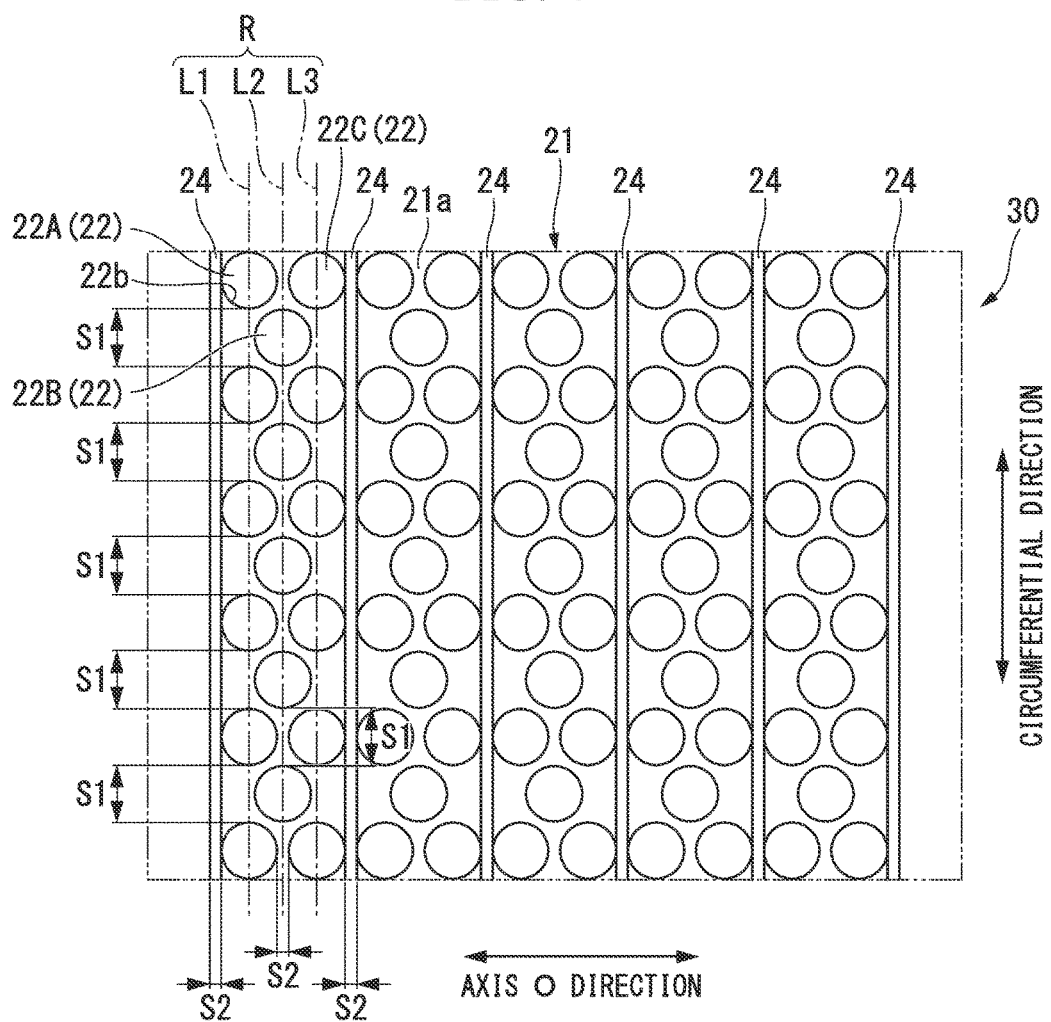
FIG. 4 is a development view of an inner circumferential surface of the hole pattern seal.
Figure 5:
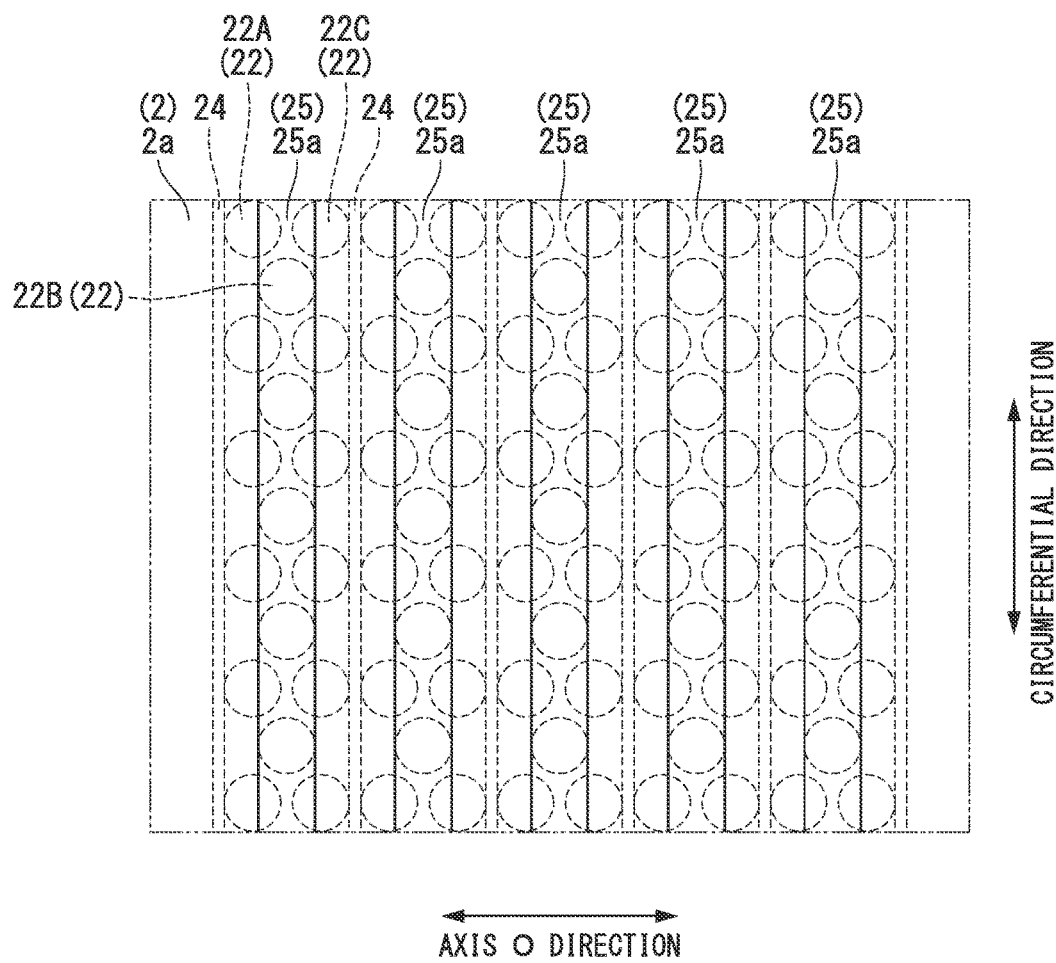
FIG. 5 is a development view of a convex portion of a rotating shaft which constituting the sealing mechanism.

As shown in FIG. 4, in the hole pattern seal 21, a first line (first hole line) L1, on which the openings 22b of a plurality of first hole portions 22A are aligned at approximately equal intervals S1 in the circumferential direction (the upward/downward direction of the sheet of FIG. 4), is formed at a first side (left side of the sheet of FIG. 4) that becomes the high pressure side in the axis O direction. Further, a third line (third hole line) L3 is formed at a second side (right side of the sheet of FIG. 4), which becomes the low pressure side in the axis O direction of the first line L1, at an interval S2 much smaller than the intervals S1. On the third line L3, the openings 22b of a plurality of second hole portions 22C are aligned at the intervals S1 in the circumferential direction like the first line L1.

A second line (second hole line) L2 on which the openings 22b of a plurality of second hole portions 22B are aligned is formed between the first line L1 and the third line L3 at the intervals S1 in the circumferential direction. The openings 22b forming the second line L2 are disposed in the middle of each interval S1 between the neighboring openings 22b of the first line L1 (and the third line L3) in the circumferential direction, and at a position that is in the middle of an interval S2 between the opening 22b of the first line L1 and the opening 22b of the third line L3, both of which are adjacent to each other in the axis O direction, in the axis O direction. In FIG. 4, for the convenience of illustration, the symbols of the first to third lines L1 to L3 are derived from a straight line (a dot and dash line in FIG. 4) passing the center of each opening 22b.

In the hole pattern seal 21, the aforementioned lines from the first line L1 to the third line L3 are set as a line group R, and multiple sets of line groups R are formed in line in the axis O direction. The openings 22b of the first line L1 and the openings 22b of the third line L3 of the neighboring line groups R are disposed at an interval S2.

As shown in FIGS. 2 to 4, fin portions 24, which radially protrude toward an inner circumference side of the hole pattern seal 21, i.e., the side of the rotating shaft 2, are formed at the first side that becomes the high pressure side of the respective line groups R. Each fin portion 24 is continuously formed on the entire circumference of the hole pattern seal 21 in the circumferential direction. Each fin portion 24 is formed in the shape of an approximately annular plate whose thickness is almost uniform. In other words, the fin portions 24 extend from high pressure side partitions K1 (see FIG. 3) that define the first hole portions 22A of the first lines L1 toward the side of the rotating shaft 2. That is, a plurality of first lines L1 are provided at intervals in the axis O direction. The fin portions 24 are provided at the high pressure side of each first line L1. The second line L2 and the third line L3 are disposed at the low pressure side of the first line L1. A distal portion 24a of the fin portion 24 is disposed with a predetermined clearance c from the outer circumferential surface 2a of the rotating shaft 2.

As shown in FIGS. 2 and 3, the rotating shaft 2 has convex portion 25 on the outer circumferential surface 2a thereof which faces the aforementioned hole pattern seal 21. Each ridge portion 25 is formed in such a way that it protrudes toward the hole pattern seal 21 and continues on the entire circumference in the circumferential direction. Each ridge portion 25 faces the openings 22b of the first hole portions 22A of the first line L1 at the low pressure side relative to each fin portion 24. Vertical walls 25b of the convex portion 25 which are located at the high pressure side are disposed at the high pressure side in the axis O direction relative to a high pressure side surface of a partition K3. Outer circumferential surfaces 25a of the convex portion 25 are disposed between the fin portions 24 adjacent to each other. In other words, each outer circumferential surface 25a is disposed with a predetermined clearance with respect to a partition K3 between the first hole portions 22A of the first line L1 and the second hole portions 22C of the third line L3 so as to overlap with the fin portion 24 when viewed in the axis O direction. As shown in FIGS. 2 to 5, the fin portion 24 is disposed approximately in the middle between the neighboring convex portion 25 and 25 in the axis O direction. That is, the convex portion 25 have an approximately symmetrical shape with respect to the middle between the partitions K3 adjacent to each other in the axis O direction.

Figure 6:
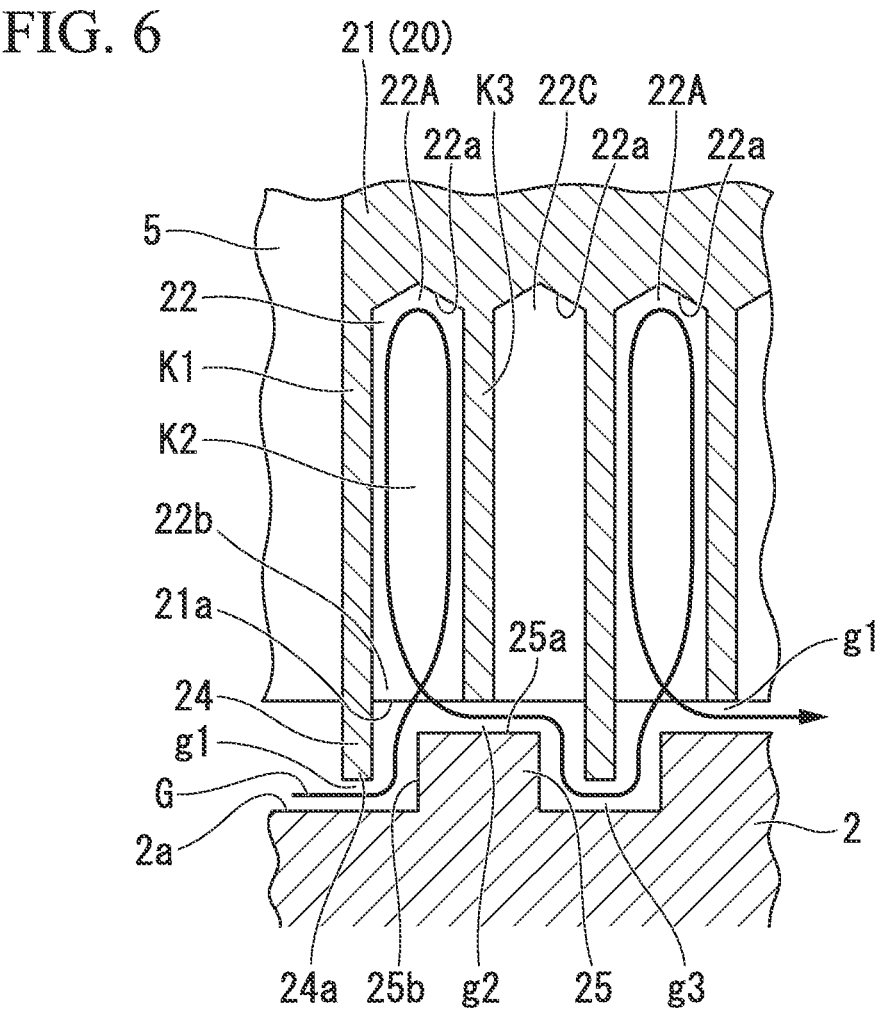
FIG. 6 is an explanatory view of an operation according to the sealing mechanism.

Next, an operation according to the aforementioned hole pattern seal 21 will be described with reference to FIG. 6.

Here, when the aforementioned rotating shaft 2 is rotated, a shear force acts on the process gas G around the rotating shaft 2 in a tangential direction of the rotation from the rotating bodies including the impellers 3. A swirl having a circumferential speed component is caused by the action of the shear force. The process gas G including the swirl is made to flow from the high pressure side toward the low pressure side due to a pressure difference between the opposite sides in the axis O direction.

First, the process gas G including the swirl is constricted by a gap g1 between the distal portion 24a of the highest pressure side fin portion 24 of the hole pattern seal 21 and the outer circumferential surface 2a of the rotating shaft 2. The process gas G entering the gap g1 proceeds toward the low pressure side in the axis O direction. In this case, the process gas G collides with the high pressure side vertical wall 25b of the ridge portion 25, and flows toward the radial outer side of the ridge portion 25, i.e. the side of the first hole portions 22A of the first line L1 of the hole pattern seal 21.

Subsequently, most of the process gas G directed to the side of the first hole portions 22A of the first line L1 flows into the first hole portions 22A, is turned back at the bottom face 22a so as to proceed to the opening 22b, and becomes a vortex. Here, since partitions K3 are also present in the hole portions 22 in the circumferential direction, the swirl of the process gas G entering the first hole portions 22A collides with the partitions K3 and is counteracted. The process gas G coming out of the first hole portions 22A is made to flow to the low pressure side, and enters a gap g2 between the partition K3 directly above the ridge portion 25 or the second line L2 and the outer circumferential surface 25a of the ridge portion 25. Afterwards, the process gas G proceeds toward a gap g3 disposed at the low pressure side and at a radial inner side relative to the outer circumferential surface 25a of the ridge portion 25. On this occasion, the process gas G meanders in a radial direction. The flow is disturbed by the meandering, and the same sealing effect as a typical labyrinth seal is to be obtained. Afterwards, the aforementioned operation is repeated as many as the number of the line groups R of the hole pattern seal 21. Even in the second hole portions 22C of the third line L3, the same level of vortex as a typical hole pattern seal 21 occurs to contribute to reducing the swirl.

Therefore, according to the centrifugal compressor 1 of the first embodiment described above, the process gas G entering through the gap g1 between the fin portion 24 of the hole pattern seal 21 and the rotating shaft 2 comes into contact with the vertical wall 25b of the ridge portion 25 of the rotating shaft 2, and can flow toward the hole portions 22 of the hole pattern seal 21. For this reason, the flow of the process gas G in a turning direction can be impeded by the partition K2 disposed in the circumferential direction of the rotating shaft 2 among the partitions of the hole portions 22, and the swirl can be reduced. Further, the gap g1 or g3 formed by the fin portion 24 and the gap g2 formed by the ridge portion 25 are disposed at positions offset in the radial direction, and thereby the process gas G meanders in the radial direction. For this reason, the leakage of the process gas G can be reduced by the sealing effect according to a so-called labyrinth structure. As a result, the leakage of the process gas G from the high pressure side to the low pressure side can be reduced while the self-excited vibration caused by the swirl is prevented.

Further, depending on numbers of the fin portions 24 and the convex portion 25 provided between the high pressure side and the low pressure side at which the hole pattern seal 21 is formed, i.e. a number by which the line groups R are formed, the swirl and leakage of the process gas G can be reduced as the number of line groups R increases.

Next, a centrifugal compressor that is a rotary machine in a second embodiment of the present invention will be described based on the drawings.

The second embodiment is merely different from the first embodiment with regard to the disposition of the hole portions 22 at the hole pattern seal. Therefore, the same portions as in the first embodiment will be described using the same symbols, and duplicate descriptions thereof will be omitted (hereinafter, this is also true of the third to seventh embodiments).

Figure 7:
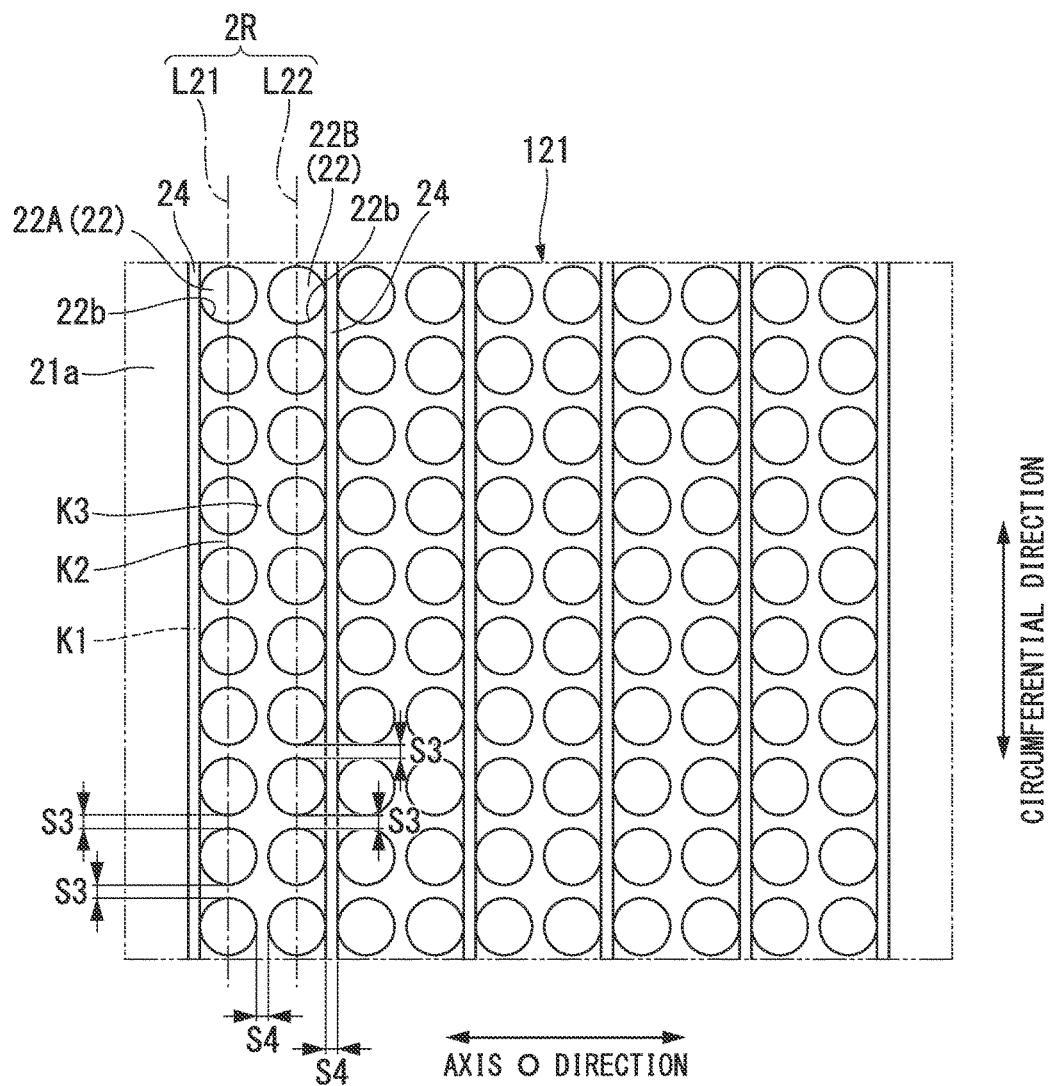
FIG. 7 is a development view corresponding to FIG. 4 in a second embodiment of the present invention.
Figure 8:
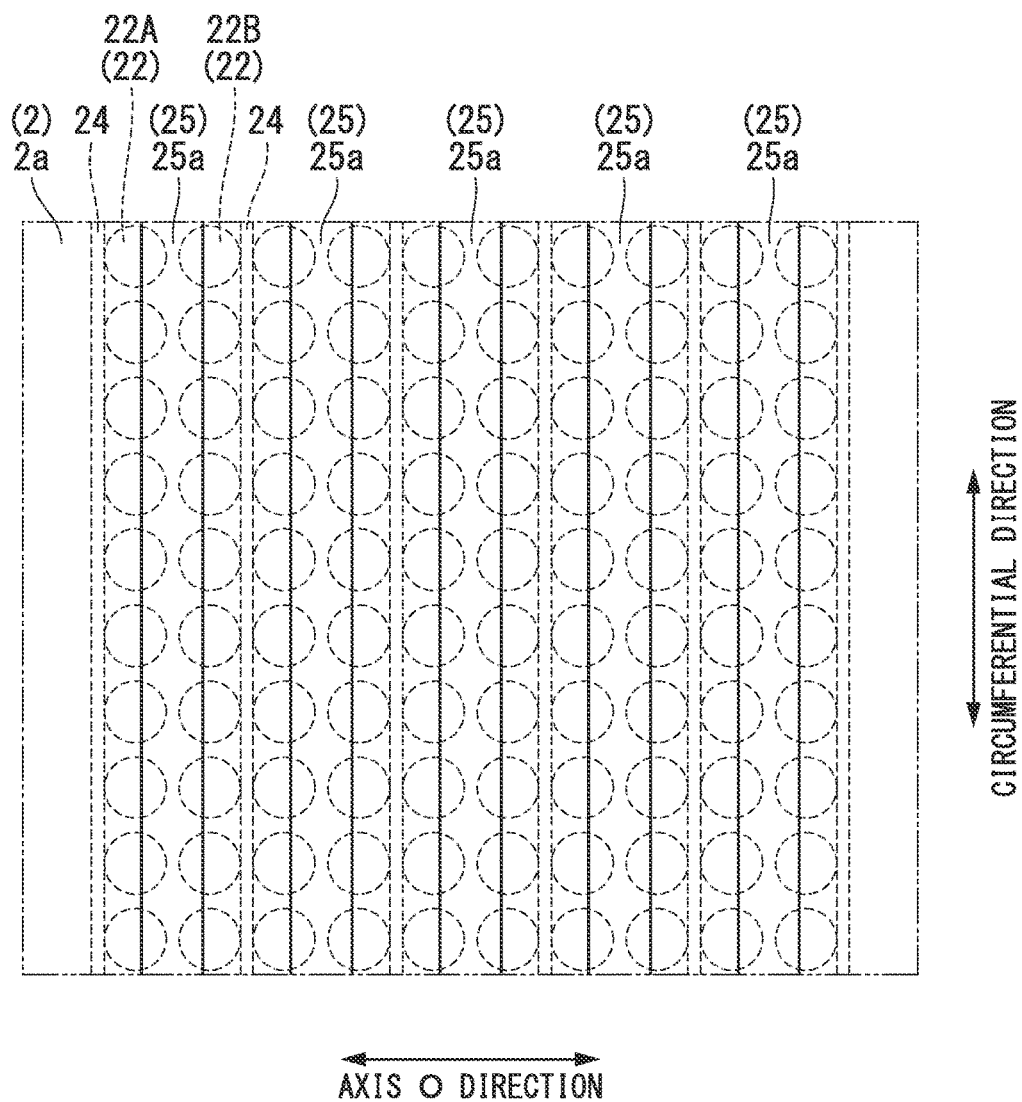
FIG. 8 is a development view corresponding to FIG. 5 in the second embodiment of the present invention.

As shown in FIGS. 7 and 8, a hole pattern seal 121 in which multiple hole portions 22 are formed is disposed on an inner circumference of an annular casing 5 disposed with a rotating shaft 2 and gaps. These hole portions 22 are formed in a circular cross section having approximately the same hole diameter. Axes of the hole portions 22 are disposed to extend in a radial direction of the rotating shaft 2. Openings 22b of the hole portions 22 are disposed on an inner circumferential surface 21a of the hole pattern seal 121 in a tetragonal shape.

To be more specific, in the hole pattern seal 121, a first line L21, on which the openings 22b of a plurality of first hole portions 22A are aligned at approximately equal intervals S3 in a circumferential direction (upward/downward direction of the sheet of FIG. 7), is formed at a first side (left side of the sheet of FIG. 7) that becomes a high pressure side in an axis O direction. A second line L22 is formed at a second side (right side of the sheet of FIG. 7) in the axis O direction of the first line L21, approximately at the same interval S4 as the interval S3. On the second line L22, the openings 22b of a plurality of second hole portions 22B are aligned at the intervals S3 in the circumferential direction like the first line L21.

In the hole pattern seal 121, the aforementioned lines from the first line L21 and the second line L22 are set as a line group 2R, and multiple sets of line groups 2R are formed in lines in the axis O direction. The openings 22b of the first line L21 and the openings 22b of the second line L22 of the neighboring line groups 2R are disposed at an interval S4.

Fin portions 24, which radially extend toward an inner circumference side of the hole pattern seal 21, i.e., the side of the rotating shaft 2, are formed at the first side that becomes the high pressure side in these line groups 2R. The fin portions 24 are continuously formed on the entire circumference of the inner circumferential surface 21a in the circumferential direction. Each fin portion 24 is formed in the shape of an approximately annular plate whose thickness is almost uniform. In other words, the fin portions 24 extend from high pressure side partitions K1, which define the first hole portions 22A of the first lines L21 adjacent to each other in the circumferential direction, toward the side of the rotating shaft 2. That is, a plurality of first lines L21 are provided at intervals in the axis O direction. The fin portions 24 are provided at the high pressure side of each first line L21. The second lines L22 are disposed at the low pressure side of the first lines L21. Similar to the first embodiment, a distal portion 24a of the fin portion 24 is disposed with a predetermined clearance c from the outer circumferential surface 2a of the rotating shaft 2.

A convex portion 25 are formed on the outer circumferential surface 2a of the rotating shaft 2 which faces the aforementioned hole pattern seal 121. Each ridge portion 25 is formed in such a way that it protrudes toward the hole pattern seal 121 and continues throughout the circumference in the circumferential direction. Each ridge portion 25 faces the openings 22b of the first hole portions 22A of the first line L21 at the low pressure side relative to each fin portion 24. Similar to between the distal portion 24a of the fin portion 24 and the outer circumferential surface 2a of the rotating shaft 2, between the outer circumferential surface 25a of the ridge portion 25 and the openings 22b of the first hole portions 22A of the first line L21, a predetermined clearance is secured. The aforementioned fin portions 24 are each disposed approximately in the middle between the neighboring convex portion 25 and 25 in the axis O direction. That is, the convex portion 25 have an approximately symmetrical shape centering on the middle of a partition K3 in the axis O direction.

Therefore, according to the second embodiment, the interval between the first hole portions 22A of the first line L21 disposed at the low pressure side of the fin portion 24 can be smaller than that of the first embodiment. For this reason, more process gas G can be caused to flow into the first hole portions 22A.

Further, since the partition K3 facing the ridge portion 25 is continuous in the circumferential direction, a clearance between the ridge portion 25 and the partition K3 can be made approximately uniform in the circumferential direction. As a result, a leakage flow rate of the fluid can be reduced by improving a sealing effect according to a labyrinth structure while a swirl is further reduced. In the aspect of strength of the hole pattern seal 121, the hole pattern seal 21 of the first embodiment is advantageous in that the partitions K2 and K3 are formed to be thicker.

Figure 9:
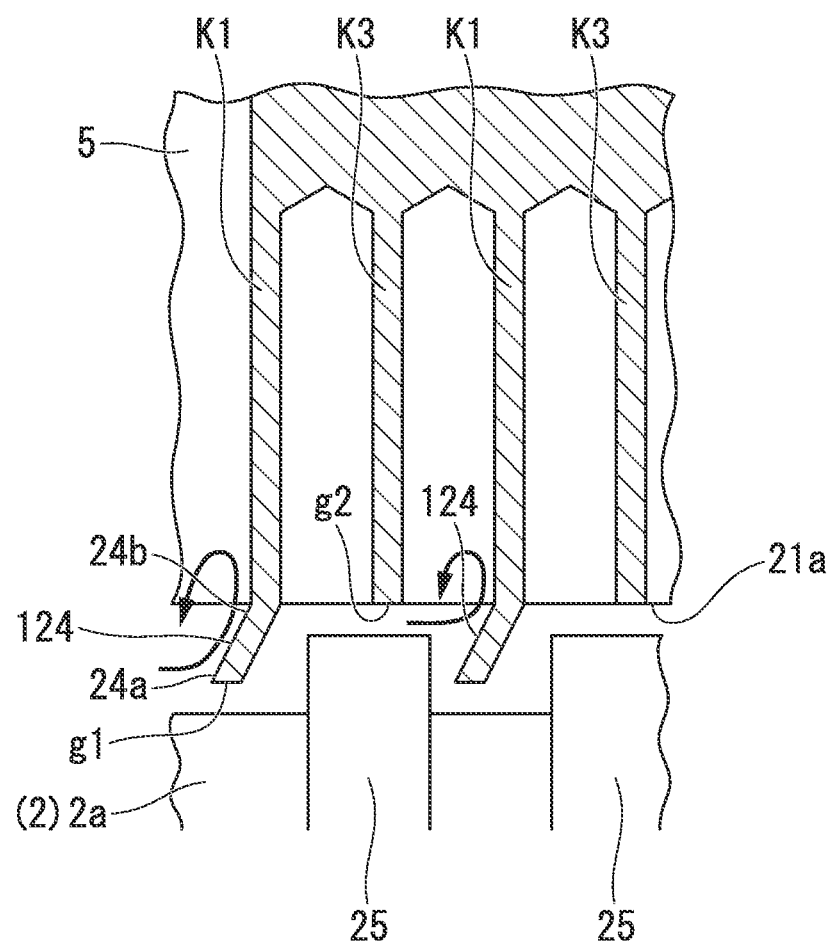
FIG. 9 is a development view corresponding to FIG. 3 in a third embodiment of the present invention.

Next, a centrifugal compressor that is a rotary machine in a third embodiment of the present invention will be described based on FIG. 9.

The distal portions 24a of the fin portions 24 in the first and second embodiments described above extend in the radial direction, whereas fin portions 124 of the centrifugal compressor of the third embodiment are formed in an inclined state such that distal portions 24a thereof are disposed at a high pressure side relative to base portions 24b thereof. In FIG. 9, an example in which the fin portions 124 are formed in a straight line shape is shown. However, the fin portions 124 may be formed such that an inclined angle gradually approaches an angle of an axis O toward the side of a rotating shaft 2.

Therefore, according to the third embodiment, especially, a process gas G colliding with the fin portions 124 easily flows along the fin portions 124 toward a radial outer side. For this reason, a flow of the process gas G to a gap g1 can be impeded by a vortex resulting from the flow directed to the radial outer side. Further, as the inflow of the process gas G to the gap g1 is impeded, a leakage of the process gas G from the high pressure side to the low pressure side can be reduced. As a result, the leakage can be further reduced while a swirl is reduced.

Figure 10:
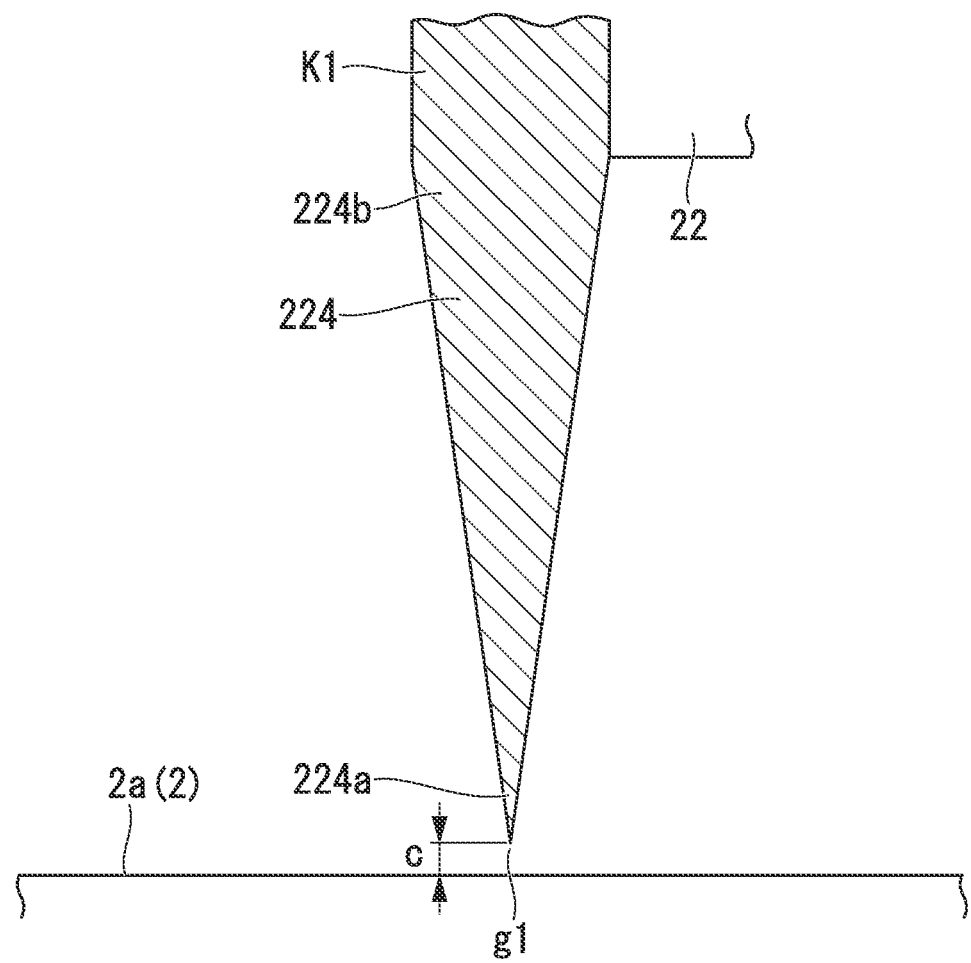
FIG. 10 is a longitudinal sectional view of a fin portion in a fourth embodiment of the present invention.

Next, a centrifugal compressor that is a rotary machine in a fourth embodiment of the present invention will be described based on FIG. 10.

The fin portions 24 and 124 in the first to third embodiments described above are formed at a constant thickness, whereas fin portions 224 of the centrifugal compressor of the fourth embodiment are formed in a tapered state such that a width dimension thereof is reduced with the approach to distal portions 224a thereof. In FIG. 10, an example in which each fin portion 224 is formed in the tapered shape as a whole is shown. However, the tapered shape may be provided from an intermediate portion between a base portion 224b and the distal portion 224a to the distal portion 224a only.

Therefore, according to the fourth embodiment, even when the fin portions 224 are brought into contact with an outer circumferential surface 2a of a rotating shaft 2 by any cause, they have the tapered shape, and thus a contact area can be further reduced. For this reason, damage caused by the contact can be suppressed to the minimum extent while a clearance c is formed to be as narrow as possible.

Figure 11:
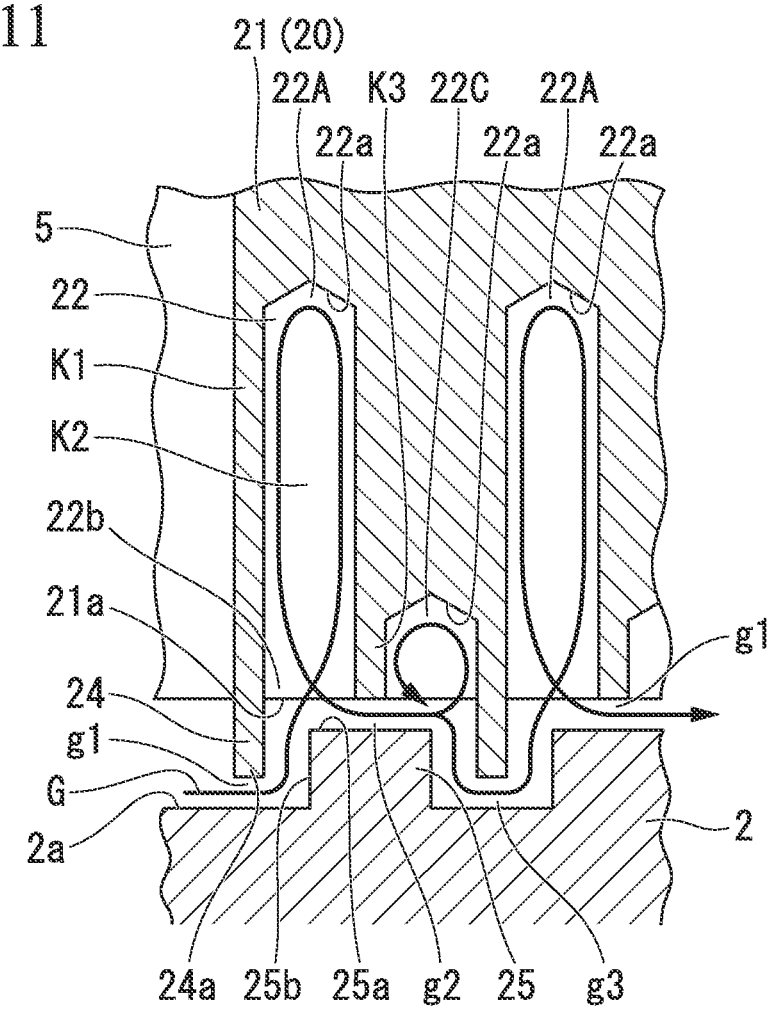
FIG. 11 is a view corresponding to FIG. 6 in a fifth embodiment of the present invention.

Next, a centrifugal compressor that is a rotary machine in a fifth embodiment of the present invention will be described based on FIG. 11. The rotary machine in the fifth embodiment, second hole portions 22C are formed to have a shallower depth than first hole portions 22A. In other words, the first hole portions 22A disposed at a high pressure side are formed to be deep, and the second hole portions 22C disposed at a low pressure side are formed to be shallow.

The first hole portions 22A are each formed so that a depth dimension thereof is greater than the diameter thereof.

The second hole portions 22C are each formed so that a diameter and depth dimension thereof are equal or similar to each other. More specifically, in the second hole portions 22C, the aspect ratio of the depth dimension to the diameter is set to 0.8 to 1.2, and preferably 1.0.

Therefore, according to the fifth embodiment, the first hole portions 22A disposed at the high pressure side are formed to be deep. Thereby, it is possible to further increase a time for which a process gas G colliding with vertical walls 25b to flow to a radial outer side remains in the first hole portions 22A. For this reason, a swirl included in the process gas G can be effectively removed.

On the other hand, the second hole portions 22C are formed to be shallow. Thereby, it is easy to form a vortex (indicated by an arrow in FIG. 11) in the second hole portions 22C relative to the first hole portions 22A. For this reason, the vortex formed at the second hole portions 22C and the process gas G flowing in an axial direction interfere with each other, the swirl included in the process gas G can be further removed. Further, the aspect ratio at the second hole portions 22C is set to 0.8 to 1.2, and preferably 1.0, and thereby it is possible to more easily cause the vortex.

Figure 12:
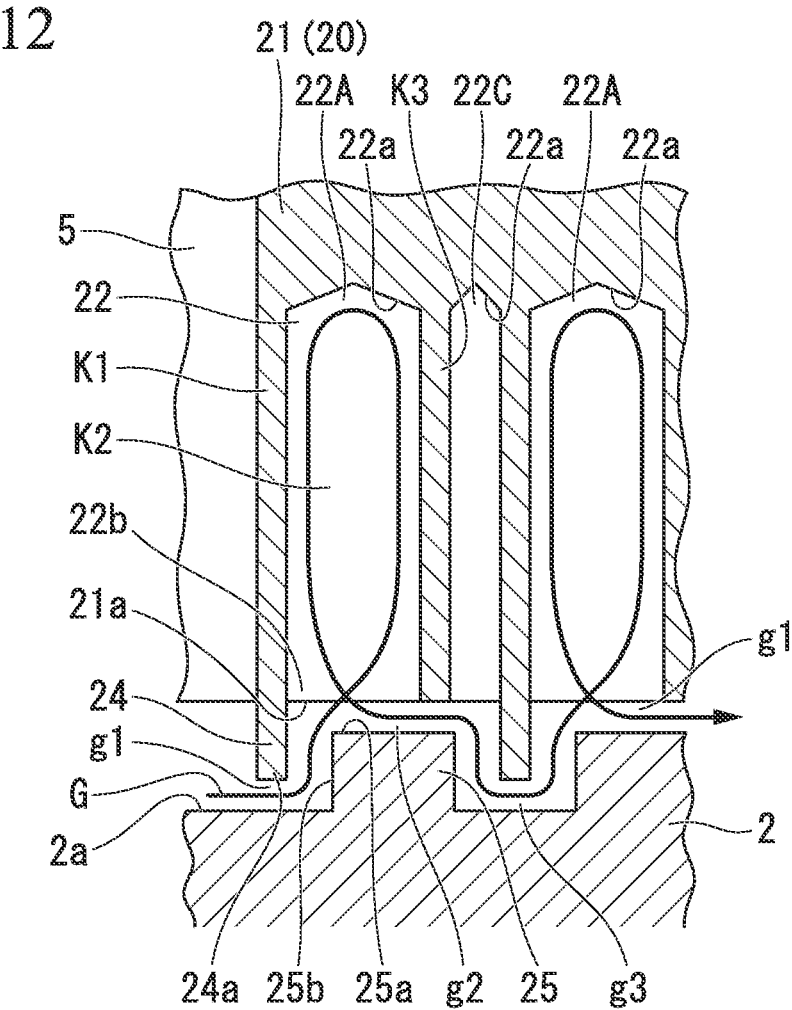
FIG. 12 is a view corresponding to FIG. 6 in a sixth embodiment of the present invention.

Next, a centrifugal compressor that is a rotary machine in a sixth embodiment of the present invention will be described based on FIG. 12. In the rotary machine in the sixth embodiment, first hole portions 22A are formed to have a greater diameter than second hole portions 22C. In other words, the first hole portions 22A disposed at a high pressure side are formed to have a greater diameter than the first hole portions 22A of the first embodiment. Further, the second hole portions 22C disposed at a low pressure side are formed to have a smaller diameter than the first hole portions 22A. In the sixth embodiment, in proportion to a smaller diameter with which the second hole portions 22C are formed with, the first hole portions 22A are formed with a larger diameter.

Further, in proportion to the large diameter with which the first hole portions 22A are formed, each partition K3 is disposed at the low pressure side relative to the middle between the convex portion 25 in an axis O direction. However, the partition K3 is disposed at a radial outer side of an outer circumferential surface 25a. The outer circumferential surface 25a is disposed with a predetermined clearance from the partition K3 in a radial direction.

Therefore, according to the sixth embodiment described above, the first hole portions 22A are formed to have a larger diameter than the second hole portions 22C. Thereby, it is possible to increase a probability that a process gas G, which flows in the axis O direction to collide with vertical walls 25b, is introduced into the first hole portions 22A. Further, even when a position of a rotating shaft 2 is changed in the axis O direction by, for instance, a change in operating conditions, it is possible to increase the probability that the process gas G is introduced to the first hole portions 22A, and thus robustness can be improved.

Figure 13:
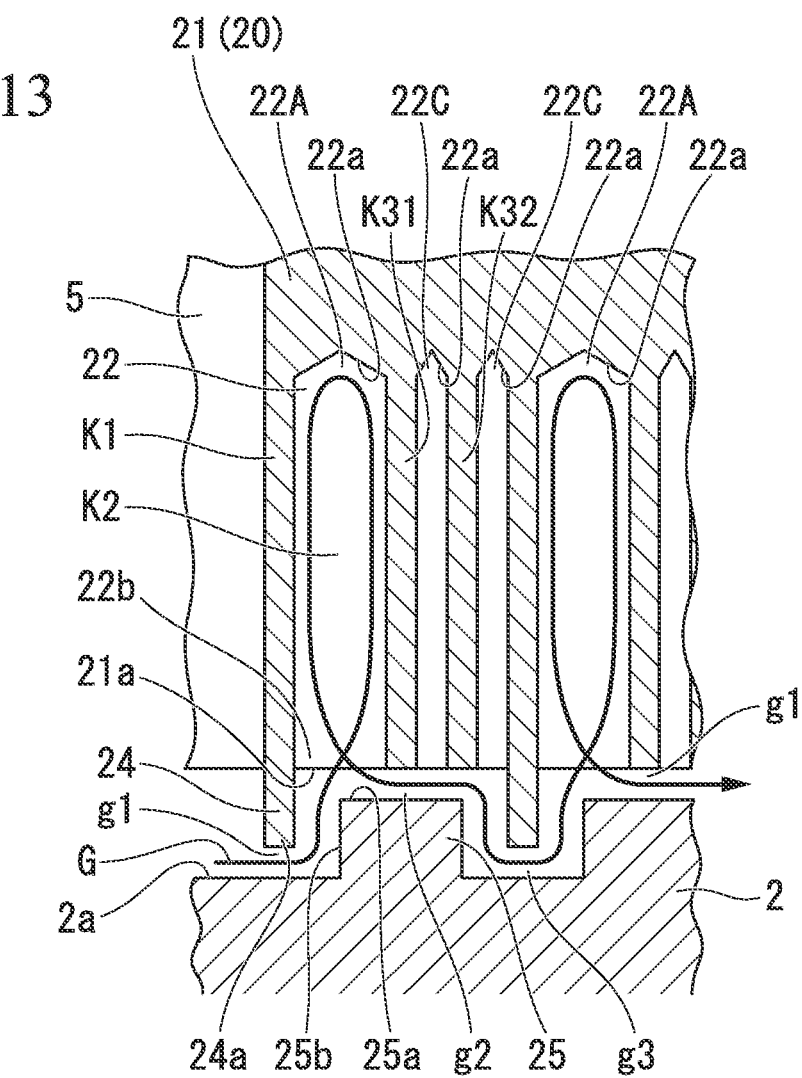
FIG. 13 is a view corresponding to FIG. 6 in a seventh embodiment of the present invention.

Next, a centrifugal compressor that is a rotary machine in a seventh embodiment of the present invention will be described based on FIG. 13. In the rotary machine in the seventh embodiment, a plurality of second hole portions 22C are provided in lines in an axis O direction. The plurality of second hole portions 22C are formed to have a still smaller diameter than the first hole portions 22C. The second hole portions 22C are formed to have depths equal or similar to those of the first hole portions 22A.

A partition K31 is formed between the first hole portion 22A and the second hole portion 22C of a high pressure side. Further, a partition K32 is formed between the second hole portion 22C of the high pressure side and the second hole portion 22C of a low pressure side.

Therefore, according to the seventh embodiment described above, since the partition K31 and the partition K32 carry out the same function as fins of a labyrinth seal, a sealing characteristic can be improved compared to when only the aforementioned partition K3 is formed.

Figure 14:
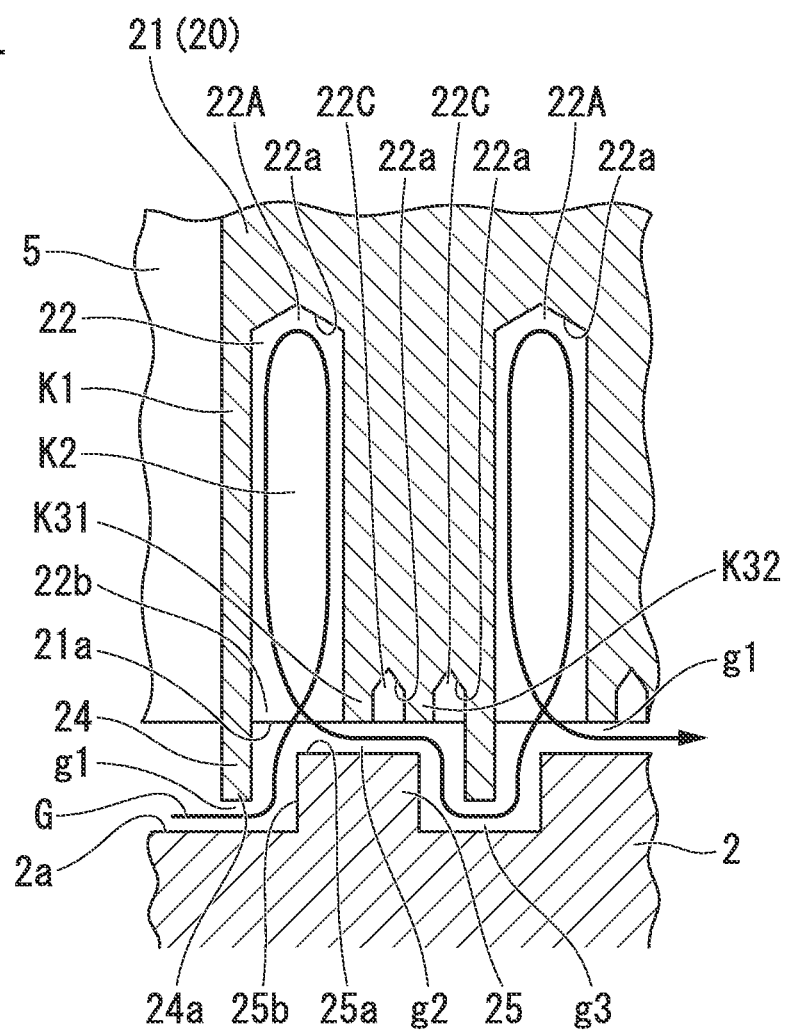
FIG. 14 is a view corresponding to FIG. 6 in a modification of the seventh embodiment of the present invention.

FIG. 14 shows a modification of the seventh embodiment described above.

In the modification of FIG. 14, second hole portions 22C are formed to have a shallower depth than the second hole portions 22C of the seventh embodiment. In the second hole portions 22C in the modification, the aspect ratio of a depth dimension to a diameter is set to 0.8 to 1.2, and preferably 1.0. By doing this, similar to the fifth embodiment, a vortex is easily formed in the second hole portions 22C. For this reason, besides improving a sealing characteristic due to a partition K31 and a partition K32, a swirl can be further reduced due to interference with the vortex.

The present invention is not limited to the constitution of each embodiment, and it can be changed in design without departing from the gist thereof.

For example, in each embodiment described above, the example in which the hole portions 22 of the hole pattern seal 21 have a circular cross section shape has been described. However, the shape of each hole portion 22 is not limited to such a shape. For example, each hole portion 22 may have a polygonal cross section shape. Further, all of the hole portions 22 do not necessarily have the same inner diameter. The inner diameters of the hole portions 22 may be changed as needed.

Further, the example in which the space between the rotating shaft 2 and the casing 5 is sealed by the sealing mechanism 20 has been described. However, the sealing mechanism 20 may be provided, for instance, between the cover part 3c of each impeller 3 and the casing 5, or between the impellers 3 of the three-stage impeller group 3A and the impellers 3 of the three-stage impeller group 3B.

Furthermore, the centrifugal compressor is not limited to the three stages. In addition, the centrifugal compressor is not limited to disposing the impeller groups back to back.

Further, as the rotary machine, the centrifugal compressor has been described by way of example. However, the rotary machine is not limited to the centrifugal compressor. The rotary machine may be a rotary machine having a sealing mechanism that is provided between a stator being a stationary body and a rotor being a rotating body and seals a space between a high pressure and a low pressure. The sealing mechanism 20 may be applied to various rotary machines such as an axial flow compressor, a radial flow turbine, and an axial flow turbine.

Further, in each embodiment, the example in which the process gas G is used as the fluid has been described. However, a fluid is not limited to the process gas G as long as a swirl can be generated therefrom. Further, the fluid is not limited to a gas, and it may be a liquid.

Further, in each embodiment, the example in which each ridge portion 25 formed on the rotating shaft 2 has the vertical walls 25b extending in the radial direction has been described. However, the direction in which the vertical walls 25b extend is not limited to the radial direction. For example, the vertical walls 25b may be inclined, or they may have a curved surface without being limited to a flat surface.

Further, in each embodiment, the example in which the convex portion 25 are integrally formed on the rotating shaft 2 has been exemplified. However, the convex portion 25 may be separately formed from the rotating shaft 2, and be fixed to the outer circumferential surface 2a of the rotating shaft 2 from the rear of the rotating shaft 2.

Further, in the seventh embodiment and its modification, the example in which the two second hole portions 22C are arranged in the axis O direction has been described. However, the number of the second hole portions 22C arranged in the axis O direction is not limited to two. Three or more second hole portions 22C may be formed in lines in the axis O direction. Further, the depths of the multiple second hole portions 22C formed in lines in the axis O direction may be different from each other.

INDUSTRIAL APPLICABILITY

The present invention is directed to the rotary machine. In the present invention, the leakage of the fluid from the high pressure side to the low pressure side can be reduced while the swirl occurring between the rotating side and the stationary side is reduced.

REFERENCE SIGNS LIST

1: centrifugal compressor
2: rotating shaft (rotor)
2a: outer circumferential surface
3: impeller
3A: three-stage impeller group
3B: three-stage impeller group
3a: disc
3b: blade
3c: cover part
4: return channel
5: casing (stator)
5a: journal bearing
5b: thrust bearing
5c: suction port
5d: discharge port
5e: suction port
5f: discharge port
6: internal space
6a: internal space
6b: internal space
12: diffuser portion
13: bend portion
14: return portion
20: sealing mechanism
21, 121: hole pattern seal 21a: inner circumferential surface
22: hole portion
22A: first hole portion
22B: second hole portion
22C: second hole portion
22a: bottom face
22b: opening
24, 124, 224: fin portion
24a: distal portion
24b: base portion
25: convex portion
25a: outer circumferential surface
25b: vertical wall
224a: distal portion
224b: base portion
c: clearance
G: process gas
g1, g2, g3: gap
K1, K2, K3: partition
K31, K32: partition
L1: first line (first hole line)
L2: second line (second hole line)
L3: third line (third hole line)
L21: first line (first hole line)
L22: second line (second hole line)
O: axis
R: line group
S1, S2, S3, S4: interval

The invention claimed is:

1. A rotary machine comprising:
a stator;
a rotor rotatable supported by the stator, configured to rotate about the axis thereof within the stator, and extending along the axis; and
a hole pattern seal fixed to the stator, and dividing a space between the rotor and the stator into a high pressure side and a low pressure side,
wherein the hole pattern seal comprises:
a first hole line,
a second hole line that is disposed at a low pressure side of the first hole line, and
a third hole line that is disposed between the first hole line and the second hole line adjacent to each other in an axial direction of the rotor,
wherein each hole line has hole portions that face an outer circumferential surface of the rotor and that are formed at intervals in a circumferential direction,
wherein the hole portions forming the third hole line are disposed in a middle of an interval between the neighboring hole portions of the first hole line in the circumferential direction and the second hole line in the circumferential direction,
wherein the hole pattern seal further comprises:
fin portions each of which extends from the stator toward the rotor and extends in the circumferential direction,
wherein the first hole line and the second hole line are disposed between the fin portions adjacent to each other,
wherein the rotor comprises:
a convex portion that protrudes from the outer circumferential surface of the rotor toward the hole portions of the first hole line and the second hole line, and that extends in the circumferential direction, and that disposed between the fin portions adjacent to each other, and
wherein the convex portion comprises:
vertical walls facing the fin portions adjacent to each other, and
an outer circumferential surface connecting the vertical walls, and facing the hole portions of the first hole line and the second hole line, and
wherein the third hole line faces the outer circumferential surface of the convex portion.

2. The rotary machine according to claim 1, wherein the fin portions are inclined such that distal side thereof directed the high pressure side.

3. The rotary machine according to claim 1, wherein a distal portion of each of the fin portions is formed in a tapered shape.

4. The rotary machine according to claim 1, wherein the hole portions of the second hole line are formed to have shallower depths than depths of the hole portions of the first hole line.

5. The rotary machine according to claim 1, wherein the hole portions of the first hole line are formed to have a greater diameter than the hole portions of the second hole line.

6. The rotary machine according to claim 2, wherein a distal portion of each of the fin portions is formed in a tapered shape.

7. The rotary machine according to claim 2, wherein the hole portions of the second hole line are formed to have shallower depths than depths of the hole portions of the first hole line.

8. The rotary machine according to claim 3, wherein the hole portions of the second hole line are formed to have shallower depths than depths of the hole portions of the first hole.

9. The rotary machine according to claim 2, wherein the first hole portions of the first hole line are formed to have a greater diameter than the hole portions of the second hole line.

10. The rotary machine according to claim 3, wherein the hole portions of the first hole line are formed to have a greater diameter than the hole portions of the second hole line.

* * * * *